United States Patent [19]

Erskine

[11] Patent Number: 4,773,765

[45] Date of Patent: Sep. 27, 1988

[54] BLENDER PUMP ADAPTOR

[76] Inventor: Wood S. Erskine, 3306 Golf Course Rd., Midland, Tex. 79703

[21] Appl. No.: 934,264

[22] Filed: Nov. 24, 1986

[51] Int. Cl.[4] .......................... B01F 7/16; B01F 15/02; F04D 1/00

[52] U.S. Cl. .................................... 366/205; 366/196; 366/314; 415/206; 415/DIG. 3

[58] Field of Search .............................. 366/195–200, 366/205, 314; 415/203, 206, DIG. 3

[56] References Cited

U.S. PATENT DOCUMENTS

| | | |
|---|---|---|
| 1,480,914 | 1/1924 | Poplawski . |
| 1,663,253 | 3/1928 | Hillborn . |
| 1,847,226 | 3/1932 | Ringwald . |
| 2,759,665 | 8/1956 | Wilber .................................. 230/235 |
| 2,771,111 | 11/1956 | Seyfried ................................. 146/68 |
| 2,865,293 | 12/1958 | Laing ..................................... 103/53 |
| 2,865,296 | 12/1958 | Bungartz ............................... 103/88 |
| 2,896,924 | 7/1959 | Jepson .................................. 259/108 |
| 3,059,583 | 10/1962 | Huber .................................. 103/117 |
| 3,107,600 | 10/1963 | Brun-Buisson ........................ 99/286 |
| 3,172,442 | 3/1965 | Otto ..................................... 146/68 |
| 3,322,070 | 5/1967 | Glass ................................... 415/206 |
| 3,559,897 | 2/1971 | Carr ..................................... 241/101 |
| 3,606,420 | 9/1971 | Hultstrom et al. ............. 415/206 X |
| 3,841,791 | 10/1974 | Doolin ........................... 415/DIG. 3 |
| 4,030,707 | 6/1977 | Moreton ......................... 366/205 X |
| 4,162,128 | 7/1979 | Ogden et al. .................... 366/314 X |
| 4,442,661 | 4/1984 | Stuart ................................... 56/16.9 |
| 4,648,719 | 3/1987 | Roben ............................ 366/314 X |

FOREIGN PATENT DOCUMENTS 646779  10/1962  Italy ..................................... 366/205

*Primary Examiner*—John Petrakes
*Attorney, Agent, or Firm*—Marcus L. Bates

[57] ABSTRACT

A pump housing is substituted for the food container of a blender. The blender blades act as a pump impeller and cause liquid to flow from a housing inlet, through the housing, and through a housing outlet. The pump housing therefore modifies a blender into a portable, multipurpose pump apparatus that moves liquid from one to another location.

16 Claims, 1 Drawing Sheet

BLENDER PUMP ADAPTOR

BACKGROUND OF THE INVENTION

Mixing devices of the type which blend various different liquids, or liquids and solids, have long been known to those skilled in the art as exemplified by the Seyfried U.S. Pat. No. 2,771,111; Poplawski U.S. Pat. No. 1,480,914; Jepson U.S. Pat. No. 2,896,924; Otto U.S. Pat. No. 3,172,442; and Carr U.S. Pat. No. 3,559,897 along with a host of other blenders and mixers.

In this disclosure, the term "blender" is intended to comprehend a mixing device having blade-like members extending from a shaft and placed within a container such as exemplified by some of the above mentioned patents. Food blenders, beverage mixers, and cutters are included in the term "blender" as used in this disclosure and claims.

A food blender is a common domestic appliance which is capable of attaining high rotational speeds. The Hamilton Beach blender, as with other popular brands, has a cutter assembly that is removably attached to the blender so that all sorts of different containers can be threadedly attached to the cutter assembly and mated with the blender base. The cutter assembly will receive the threaded end of a mason jar thereon, for example. This judicious and intelligently designed cutter assembly has made it possible for the housewife to take any number of different sizes of jars, screw the jar onto the cutter assembly, and place the cutter assembly on the base so that the motor within the base drives the cutter assembly thereby blending whatever may be contained within the jar.

From time to time, a small pump is needed about the home or workpiece from pumping a liquid from here to there. It would be convenient to be able to pump at variable rates a relatively small quantity of liquid, as for example emptying an aquarium, or emptying a stopped up bath tub to a commode and vice versa, or picking up water which has inadvertently accumulated somewhere, or draining a water bed, or wading pool, etc. A pump assembly is usually a large, expensive apparatus that is not available in but a few domestic households. It would therefore be desirable to have made available in inexpensive pump assembly which can be used by the average household or workplace for pumping a quantity of liquid from one to another location. Such a device should be portable, rapidly assembled, and easily cleaned.

An inexpensive apparatus which achieves the above desirable attributes is the subject of the present invention.

SUMMARY OF THE INVENTION

A variable speed blender is modified to provide a domestic pump for use in the kitchen or workplace. The blender is of the type having a container removably attached to a base, with the base having a motor driven shaft associated therewith. The container has a cutter assembly in the lower end thereof which includes a shaft which drives a set of cutter blades. The container has an upwardly and downwardly directed opening, and includes a removable closure member in the bottom thereof. The shaft driven cutter is journaled to the closure member. This arrangement of a blender permits a number of different containers to advantageously be attached to the cutter assembly. This invention provides a pump housing which is substituted for the container to provide the aforesaid multipurpose pump.

The pump housing is downwardly opening and has a closed upper end, a fluid inlet, a fluid outlet, and means adjacent to the lower opening end for attachment of the housing to said removable closure member. The housing is arranged respective to the cutter blade assembly so that the blade is positioned for rotation within the housing interior. Accordingly, rotation of the cutter blade acts like a pump impeller and causes fluid to flow from the inlet, through the housing, and from the outlet.

It is preferred that the inlet and outlet be positioned above the cutter blade assembly so that the pump becomes self priming once it has pumped liquid. An optional container can be placed in series with the outlet at a downstream location and filled with liquid to enable the pump to be primed so that there is no problem moving fluid through the pump when it is first energized.

A primary purpose of the present invention is the provision of means by which an ordinary household kitchen blender can be modified into a pump.

Another object of the invention is to provide a pump in combination with a blender device which enables liquid to be lifted from one to another location.

A further object of this invention is to disclose and provide a novel housing which modifies a kitchen blender into a liquid pump when the housing is substituted for the usual container associated with the blender.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described herein.

DETAILED DESCRIPTION OF THE PREFERRED EMBODIMENT

Figure 1:
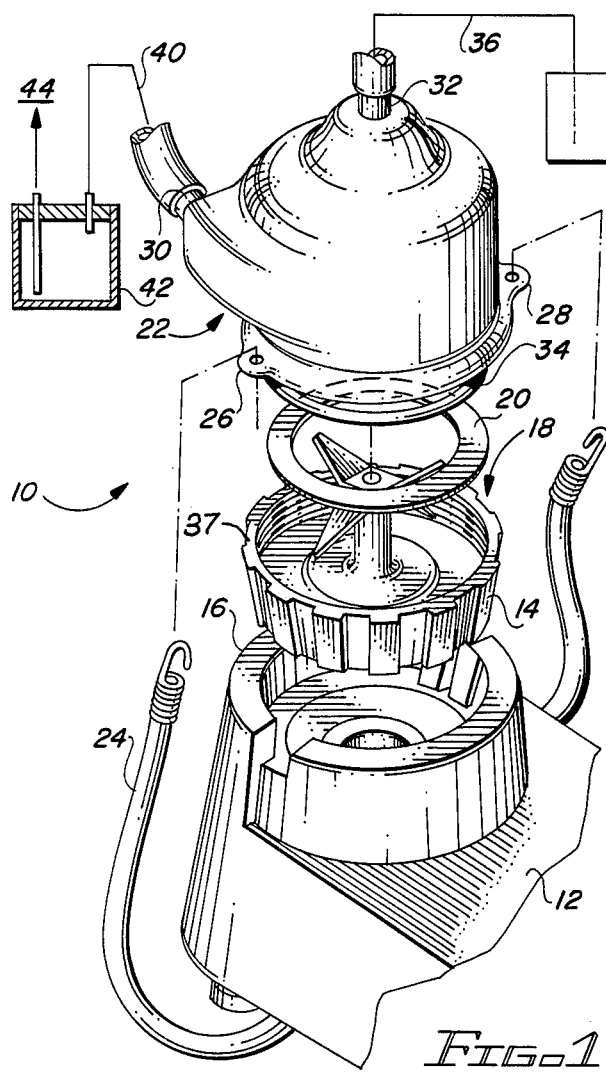
FIG. 1 is a broken, part schematical, part diagrammatical, part cross-sectional, exploded view showing the present invention in combination with a blender base.
Figure 2:
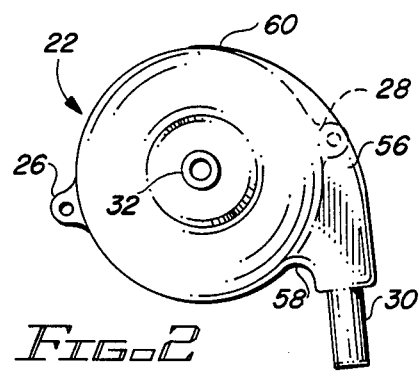
FIG. 2 is a top plan view of part of the apparatus disclosed in FIG. 1.
Figure 3:
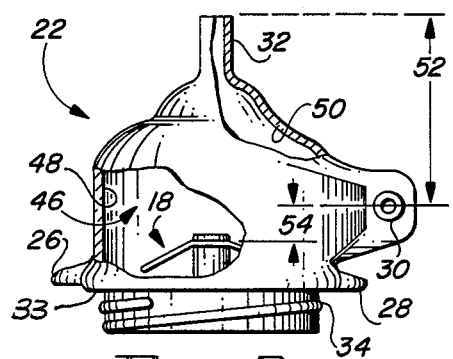
FIG. 3 is a side elevational, part cross-sectional view of the apparatus disclosed in FIG. 2, with some parts being broken away therefrom, and the remaining parts being shown in cross-section.
Figure 4:
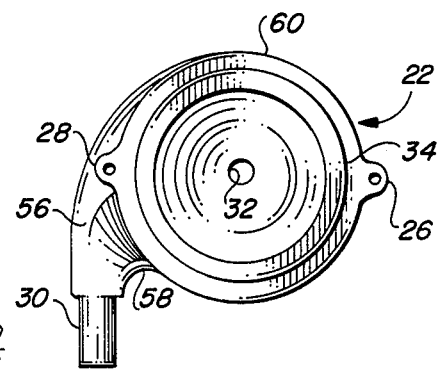
FIG. 4 is a bottom view of the apparatus disclosed in FIG. 3.
Figure 5:
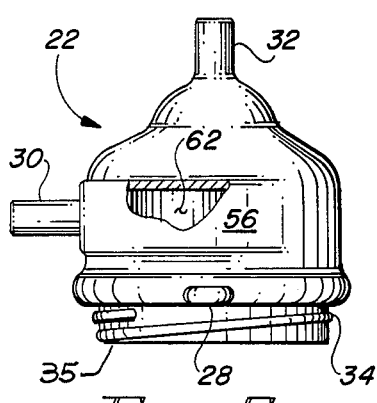
FIG. 5 is a side elevational view of the apparatus disclosed in FIG. 3 which has been rotated axially 90°; and, FIG. 6 is a fragmentary, part cross-sectional, part diagrammatical presentation of the invention disclosing the principle of operation thereof.

In FIG. 1 of the drawings, there is shown a combination 10, made in accordance with the present invention. The combination 10 includes a prior art blender apparatus having a base 12 within which there is housed the motor, shaft, and controls for operation of the blender. An upwardly opening blender base skirt 16 is made into a complementary configuration required for accepting the illustrated retainer ring 14 such that the ring 14 is non-rotatably captured in a removable manner respective to the skirt 16 of the base 12.

The ring 14 removably receives a cutter unit 18 therewithin. Gasket 20 is interposed between part of the cutter unit and a novel pump housing 22, made in accordance with the present invention.

The novel pump housing 22, when assembled respective to the retainer ring, the cutter unit, and gasket are bottom supported within the blender base skirt 16 in the same manner of an ordinary blender container. Restraining means 24, preferably in the form of an elongated elastic member having hooks at opposed ends thereof, engages a pair of opposed eyelets 26, 28 and thereby further secures the pump housing 22 to the skirt 16.

As seen illustrated in various figures of the drawings, an outlet 30 of the housing is located above the cutter unit 18 and below an inlet 32 of the housing. Numeral 36 indicates a fluid conduit connecting the inlet 32 to a liquid contained within a vessel 38. The vessel 38 can be any source of liquid or any fluid containing enclosure such as a fish tank having any liquid accumulation therein desired to be moved from 38, through tubing 36, through the pump housing 22, through fluid conduit 40, into an optional primer device 42, and to a point of disposal at 44.

Looking now to the details of FIGS. 2-6, and in particular FIGS. 2-5, where the details of the housing 22 are more specifically illustrated. The housing 22 has an interior 46 formed by cylindrical sidewalls 48 which curve into a closure member at 50 to provide a downwardly opening housing having a threaded lower marginal end 34 opposed to the inlet port 32. The marginal end 34 can be any other suitable attaching means deemed desirable.

Numeral 52 illustrates the vertical distance between the inlet and outlet, while numeral 54 indicates the vertical distance between the cutter assembly 18 and the outlet 30. Accordingly, the cutter assembly preferably lies below the outlet 30 which preferably lies below the inlet 32; and accordingly, once the apparatus is pumping fluid, there will always be residual fluid left about the cutter assembly 18, so that the apparatus is self priming when it is subsequently operated another time.

The outlet 30 is formed at the marginal terminal end of a voluted or spiraled chamber 56, made like a french curve at opposed sides 58, 60 thereof. The voluted outlet 56 has an interior 62 which communicates the outlet port 30 with the interior 46 of the housing.

Figure 6:
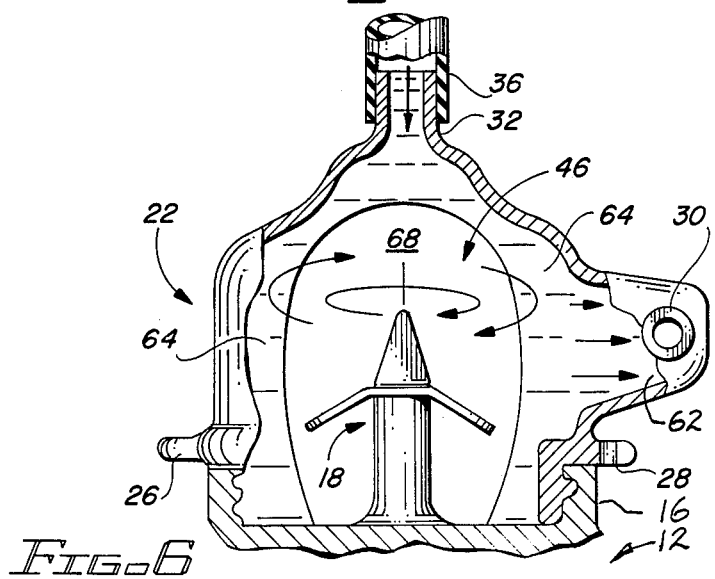

As particularly seen illustrated in the schematical representation set forth in FIG. 6, it will be noted that the cutter assembly 18 acts as a pump impeller, causing the liquid 64 to be centrifuged outwardly so that a low pressure area 68 exists about the impeller with the liquid being sucked from the inlet 32 and forced outwardly at 64. In this manner, substantial pressure is developed at outlet 30 causing liquid to flow from the inlet and through the outlet.

Example I: A Hamilton Beach model 225 was purchased and a porcelain housing 22 was fabricated by employing the same techniques used for building ceramic vases and other containers. The housing was coated with a ceramic glazing material and then fired in an electric kiln. The housing 22 was made with a lower threaded end 34 which downwardly extends from an annular shoulder 35. The annular should 35 is an integral part of the vertical cylindrical wall 48 and defines the termination of the threaded area 34.

The threaded marginal end 34 was made complementary respective to the threaded interior of the retaining ring 14, while the lowermost annular edge 35 seated against gasket 20 which in turn seated against the annular floor of the cutter unit 18. The shoulder 33 of the housing 22 is spaced from annular edge 37 of the ring 14.

The housing and cutter unit were properly assembled and mounted to the blender base so that when the blender is energized, the cutter blade 18 revolves within the housing 22 in proximity of the voluted part 56 so that the cutter blade acts in the manner of a pump impeller. The tie-down 24 is of conventional design and a medial length thereof was placed under the blender base with the opposed marginal ends being extended upwardly into engagement with the eyelets 26, 28. That is, the illustrated hooks are fastened to the eyelets.

The optional priming container 42 is about the size of a 16 ounce tin can, and as an example is easily fabricated by soldering the illustrated inlet pipe and standpipe into proper position. The can is filled with liquid. When the container apparatus 42 is inverted and held above the housing 22, liquid gravitates from the interior 42 and fills the lower interior 46 of the housing 22. The container 42 is then returned to its upright position illustrated in FIG. 1. The blender is now energized, causing the cutter assembly 18 to rotate at high velocity. This action causes the liquid contained within chamber 46 to assume the configuration illustrated at 64, 68 in FIG. 6, thereby causing the centrifuged liquid to flow from a source at 38, through conduit 36, into the inlet 32, through the outlet 30, along conduit 40, thereby filling the container 42 with the liquid which continues to flow to disposal at 44.

Accordingly, the present apparatus sets forth the combination of a pump and blender. The pump provides a useful addition to the accessories previously associated with a blender apparatus. The pump of the present invention is used in combination with a blender of the type having a container removably attached to a base, the base having a motor driven shaft, the container having a shaft driven cutter, the container being upwardly opening and having a removal closure member at the bottom thereof, with the shaft driven cutter being journaled to the closure member. The pump includes a housing which is substituted for the container. The substituted housing downwardly opens and includes a closed upper end having a fluid inlet formed centrally thereof. The pump housing further includes a pump outlet formed at the side thereof, and means forming a lower opening end for attachment to the removable closure member. The housing is arranged respective to the cutter assembly to position the cutter blade within the housing interior at a location below the pump outlet and inlet so that rotation of the cutter blade acts like a pump impeller and forces fluid to flow from the inlet, into the housing, and through the outlet.

Those skilled in the art, having studied the above description and drawings which exemplify one embodiment of the invention, together with the claims, will be led to comprehend a novel pump comprising a blender and pump housing combinaton once the present concept is appreciated and digested.

It will be immediately apparent to those versed in the art that the invention is capable of modification without departure from the spirit and scope of the invention. for example, the blender cutting blades can be modified by adjustment or substitution to conform to a more conventional impeller configuration. Similarly, although the pump herein described was constructed from a ceramic material, the construction from some other material such as plastic, metal, or glass should not be precluded as being embraced by this intellectual property right.

I claim:

1. A pump which comprises the combination of a blender base, a retaining ring, and a pump housing;

said pump housing is attached to said retaining ring; means mounting a cutter blade in journaled relationship respective to said retaining ring, said cutter blade is located on the interior of said housing; said ring is removably attached to said blender base;

said housing has a fluid inlet and a fluid outlet; said housing, when attached to said retaining ring, forms an enclosure therein; means associated with said blender base for rotating said cutter blade at high speed respective to said retaining ring;

whereby: said inlet can be connected to a source of liquid and said outlet can be connected to supply liquid at a location remote from the source, whereupon, when the cutter blade is rotated at high speed, liquid is forced to flow from the source, through the housing, and to the remote location.

2. The combination of claim 1 wherein said inlet is positioned above said outlet; and, said outlet is positioned above said cutter blade, and the remote location is at an elevation that represents a significant head developed by the pump.

3. The combination of claim 1 wherein said outlet is located between said inlet and said cutter blade and is in the form of a convolute.

4. The combination of claim 1 wherein said retaining ring has a thraded surface formed thereon which threadedly engages a complimentary threaded surfce formed on said housing, and said outlet is in the form of a volute.

5. The combination of claim 1 wherein said outlet is located at an elevation between said inlet and cutter blade, and said outlet is in the form of a volute.

6. The combination of claim 1 wherein said inlet is positioned above said outlet, said outlet is positioned above said cutter blade, said outlet is in the form of a volute, said housing has a threaded lower marginal end made complementary respective to a threaded surface formed on said retaining ring which mounts the cutter blade for rotation within the enclosure.

7. A pump which comprises the combination of a blender base, a closure member, and a pump housing;

said closure member is supported by said base, said closure member having a cutter blade journaled thereto, said housing having a fluid inlet and outlet, means associated with said blender base and said closure member for rotating said cutter blade;

said closure member forms a lower end of said housing, said cutter blade is positioned in the interior of said housing, said housing has a circumferentially extending side wall within which said outlet is formed, said housing forms an enclosure;

whereby said inlet can be connected to a source of liquid and said outlet can be connected to a location remote from the pump and liquid can be transferred from the source, through the pump, and to the remote location.

8. The combination of claim 7 wherein said inlet is positioned above said outlet; and, said outlet is positioned above said cutter blade, and the remote location is at an elevation that represents a significant head developed by the pump.

9. The combination of claim 7 wherein said outlet is located between said inlet and said cutter blade, and said outlet is in the form of a convolute.

10. The combination of claim 7 wherein said closure member is a retaining ring having a threaded surface formed thereon which threadedly engages a complementary threaded surface formed on said housing.

11. The combination of claim 7 wherein said outlet is located at an elevation between said inlet and cutter blade, and said outlet is in the form of a volute.

12. The combination of claim 7 wherein said inlet is positioned above said outlet, said outlet is positioned above said cutter blade, said outlet is in the form of a volute, said housing has a threaded lower marginal end made complementary respective to a threaded surface formed on said closure member, said closure member is in the form of a retaining ring which mounts the cutter-blade for rotation within the enclosure.

13. A blender base of the type having a motor therein and a closure member removably attached to said base, said closure member having a cutter blade journaled thereto and with there being means associated with said blender base and said closure member for rotating said cutter blade; the combination with said base and closure member of a housing by which said base, closure member, and housing can be assembled into a pump;

said housing having an inlet spaced from an outlet, an interior, and an lower end; said closure member closes the lower end of said housing whereby said housing forms an enclosure, said cutter blade is positioned in the interior of said housing, said housing has a circumferentially extending side wall within which said outlet is formed;

whereby said inlet can be connected to a source of liquid and said outlet can be connected to an elevated location remote from the pump and liquid can be transferred from the source, through the pump, and to the remote location.

14. The combination of claim 13 wherein said inlet is positioned above said outlet; and, said outlet is positioned above said cutter blade, the remote location is at an elevation that represents a significant head developed by the pump; said outlet is in the form of a convolute; said closure member is a retaining ring having a threaded surface formed thereon which threadedly engages a complementary threaded surface formed on said housing.

15. In a blender of the type having a closure member removably attached to a base, the base having a motor driven shaft; the closure member having a shaft driven cutter mounted thereon, said shaft driven cutter being journaled to said closure member and adapted to be driven by the motor, the improvement comprising:

a pump housing connected to said closure member; said pump housing forms an enclosure about a hollow interior, means forming a fluid inlet and fluid outlet for said housing that is in communication with said interior;

means by which said housing is attached to said removable closure member; said housing being of a configuration to position said cutter within the housing interior such that rotation of the cutter provides an action similar to a pump impeller and forces fluid to flow from the inlet, into the housing interior, and through the outlet to a location remote from the pump.

16. The improvement of claim 15 wherein said inlet is positioned above said outlet; and, said outlet is positioned above said cutter, and the remote location is at an elevation that represents a significant head developed by the pump.

* * * * *

UNITED STATES PATENT AND TRADEMARK OFFICE
CERTIFICATE OF CORRECTION

PATENT NO. : 4,773,765
DATED : SEPTEMBER 27, 1988
INVENTOR(S) : WOOD S. ERSKINE

It is certified that error appears in the above-identified patent and that said Letters Patent is hereby corrected as shown below:

```
Column 1, line 36, substitute --workplace for-- for
"workpiece from";

Line 45, substitute --an-- for "in".

Column 3, line 68, substitute --shoulder-- for "should".

Column 4, line 68, substitute --For-- for "for".

Claim 4, line 38, substitute --threaded-- for "thraded";

Line 39, correct the spelling of "surface".

Claim 13, line 33, substitute --a-- for "an".
```

Signed and Sealed this

Twenty-eighth Day of February, 1989

Attest:

DONALD J. QUIGG

Attesting Officer   Commissioner of Patents and Trademarks